United States Patent Office 2,824,710
Patented Feb. 25, 1958

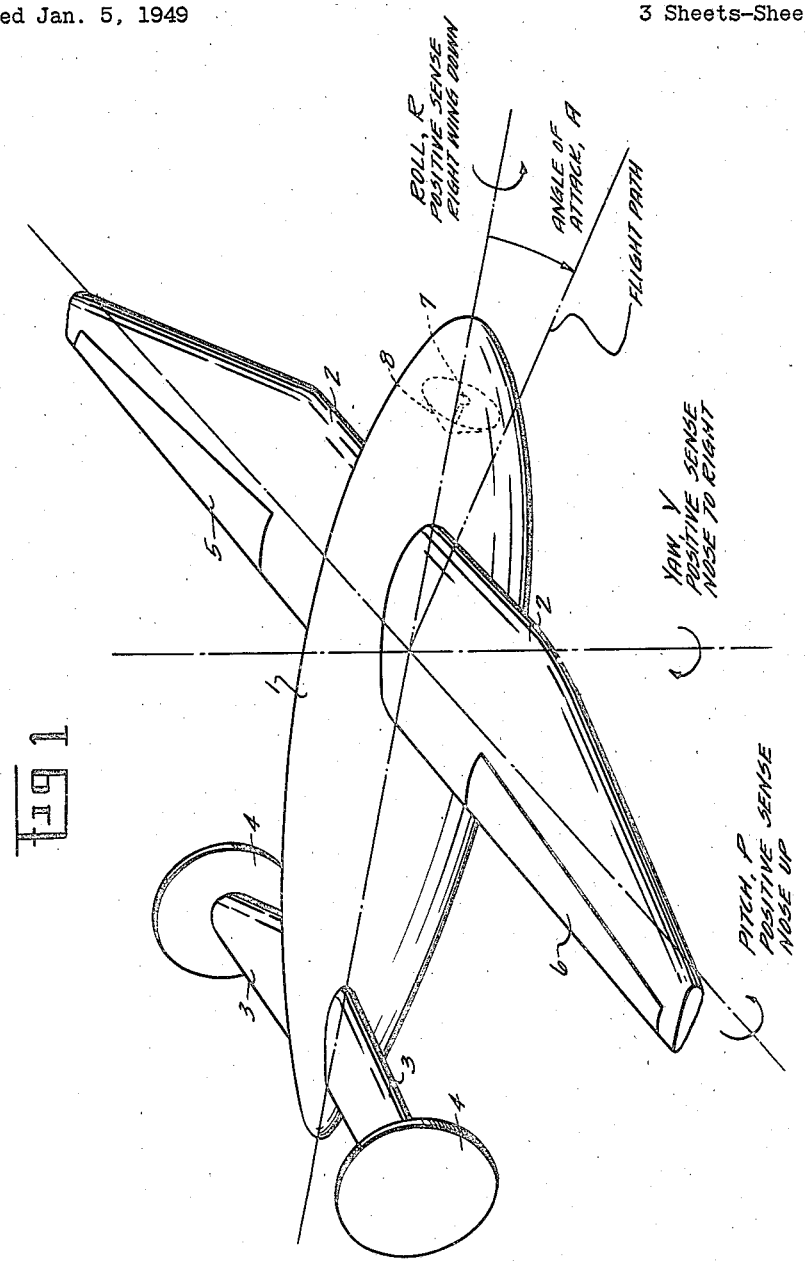

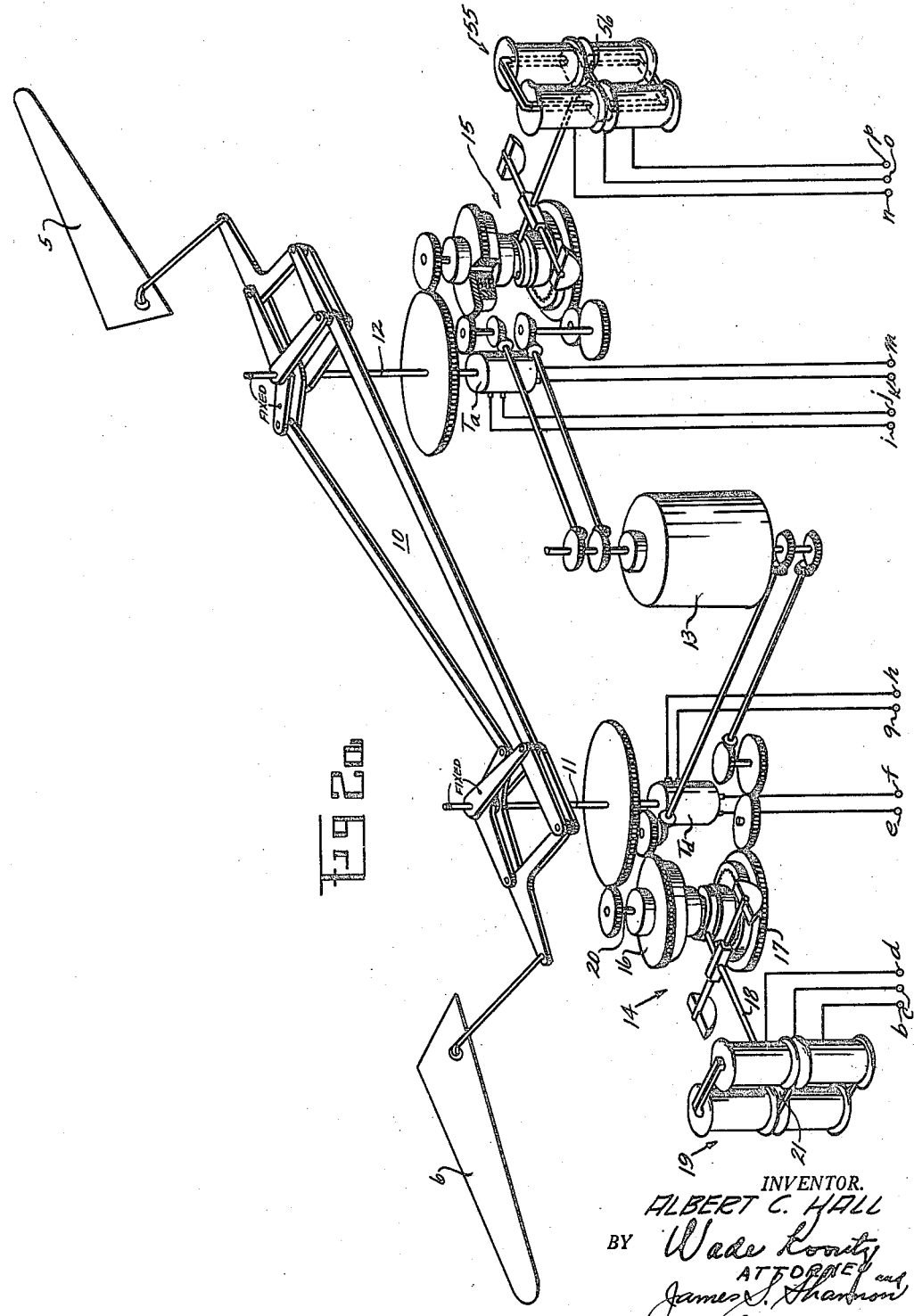

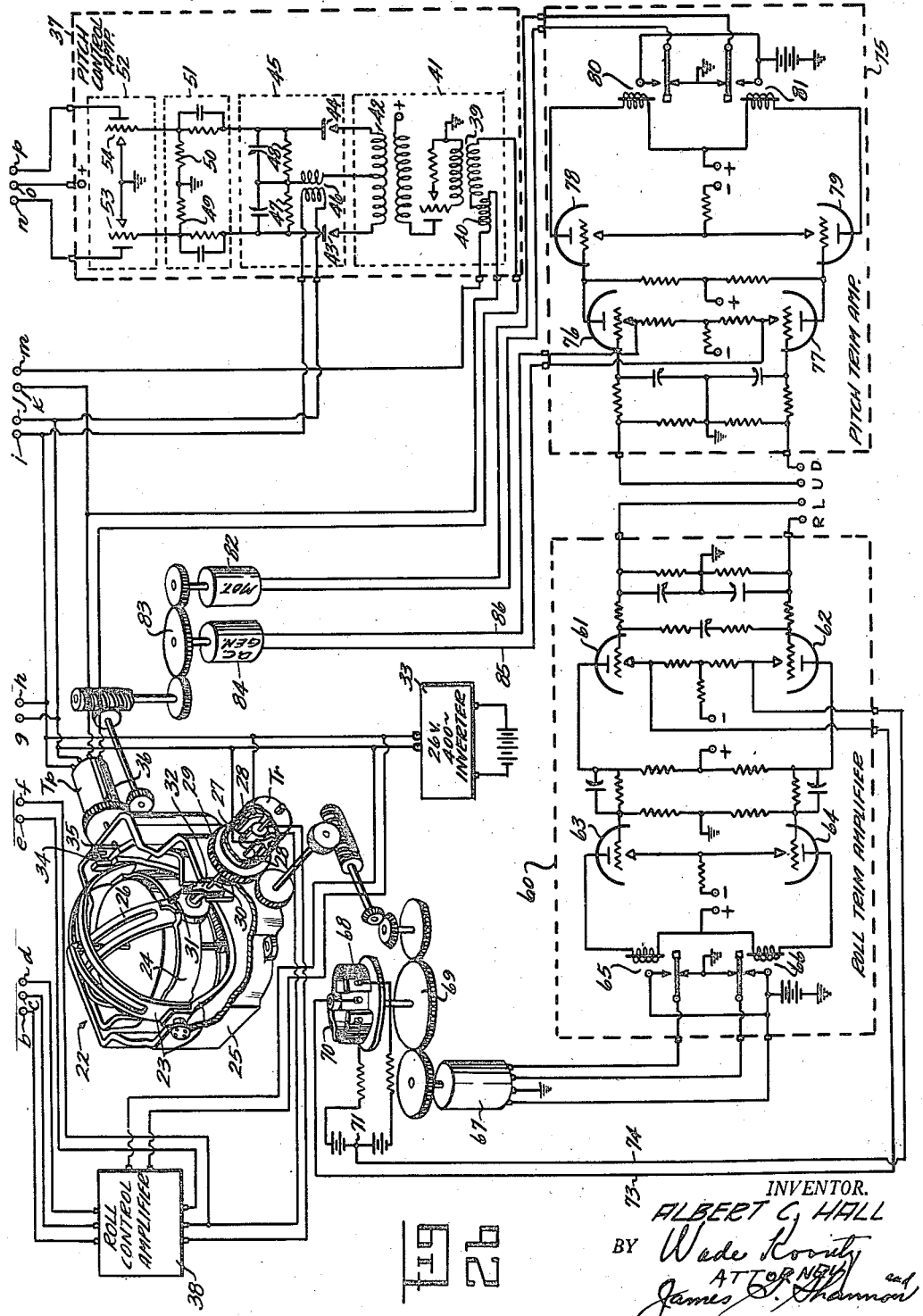

2,824,710

CONTROL SYSTEM FOR GUIDED MISSILES

Albert C. Hall, Bloomfield Township, Oakland County, Mich., assignor to the United States of America as represented by the Secretary of the Air Force Application January 5, 1949, Serial No. 69,364

7 Claims. (Cl. 244—14)

This invention relates to servo control systems and has as its principal object the provision of a servo control system for a guided missile having the aerodynamic form of a glider employing elevon control surfaces.

It is a further object of the invention to provide a control system responsive to electrical up-down and right-left signals, produced by a suitable scanning device carried by the missile, to act through the elevon control surfaces to cause the missile to home on a target.

It is a further object of the invention to provide a control system responsive to electrical signals received from a vertical gyroscope carried by the missile and acting through the elevon control surfaces to stabilize the glider in roll and pitch.

It is a still further object of the invention to provide a servo control system for a glider type missile which, in the absence of a homing signal, causes the glider to fly with wings level and at a constant glide angle, and, in the presence of a homing signal, produces rates of correction in yaw and pitch that are proportional to the magnitude of the error in yaw and pitch.

The construction and operation of the servo control system forming the invention may be best understood by a description of a specific embodiment thereof as shown in the accompanying drawings in which Fig. 1 shows the outline of a suitable glider type missile, and Figs. 2a and 2b show the servo control system used in the glider of Fig. 1.

Referring to Fig. 1 the missile is in the form of a glider having a fuselage 1, wing surfaces 2, fixed stabilizing surfaces 3 and 4, and elevon control surfaces 5 and 6 the characteristics of which will be explained later. In addition to the necessary explosives the fuselage 1 contains the servo control system, a source of power and a scanning device for providing up-down and right-left signals to the control system to cause the missile to home on the target. In the embodiment shown the scanning system comprises an antenna 7 mounted at the focus of a parabolic reflector 8. This antenna system is mounted with the axis of the parabola making a slight angle to the direction of flight of the glider so that by rotating the parabola and antenna a conical scan of a circular area centered on the extended direction of flight is produced. The target may be illuminated by a radar transmitter carried by the glider, in which case antenna 7 acts as both transmitting and receiving antenna, or the target may be illuminated by a radar transmitter in the parent airplane in which case no transmitter is required in the glider. A radar receiver and commutator (not shown) are mounted in the glider and receive signals from antenna 7. The commutator rotates with the parabola 8 and antenna 7 and serves to distinguish between signals received from the upper, lower, right and left semicircles of the scanned area. It further cooperates with an associated circuit to produce two direct voltages indicating up-down and right-left errors, the amplitudes of the voltages being proportional to the magnitude of the error and the polarities of the voltages being indicative of the directions of the errors. The servo control system constituting the invention is designed to operate with a control signal of this type, however the above described antenna, commutator and receiver for producing this control signal form no part of the invention and no further description thereof will be necessary.

As will be noted in Fig. 1 the control elements of the glider are somewhat unconventional in that complete orientation of the glider in space is obtained solely by the two control surfaces 5 and 6. These surfaces are termed elevons and are so designed that (1) they can be moved differentially as a conventional aileron is moved and (2) they can be moved up and down together in order to vary the lift characteristics of the wing. A differential displacement of the elevons rolls the glider just as ailerons roll a conventional airplane. A change in the average position of the elevons results in a change in the lift characteristic of the wing and changes the angle of the glide path of the glider. When the glider is rolled away from the horizontal the resulting component of lift acting crosswise to the flight path results in a rate of yaw and changes the directional heading of the glider. Hence complete control of the glider about its axes of pitch, roll and yaw is effected by the elevons alone. Some advantages resulting from the use of elevon control surfaces are simplicity in manufacture, a simplification of the control system and the fact that the glider can be so designed that the angle of attack, defined in Fig. 1, remains relatively independent of the average position of the elevons. The last advantage is important since, with a fixed angle of attack, constant adjustment of the antenna orientation to insure that the scanning is always in the direction of flight is not required.

The control system for the above described glider missile is shown in Figs. 2a and 2b. The operational characteristics of this system may be grouped under two headings as follows:

*System response to air disturbances*

The relative angular positions of the vertical gyroscope in Fig. 2b with respect to the glider are measured in pitch and roll and these angles are used to control the average and differential positions, respectively, of the elevons. The differential position of the elevons is made proportional to the error between a reference angle and the actual orientation of the glider in roll as measured by the vertical gyroscope. Similarly, the displacement of the average elevon position from neutral is proportional to the error between the prescribed glide path and the actual pitch orientation of the glider. The relations between gyroscope angles, reference angles, and elevon displacements are summarized by the following equations:

$$E_d = k_1(R_t - R_0) \quad (1)$$

$$E_a = k_2(P_t - P_0) \quad (2)$$

in which:

$E_d$ = elevon differential displacement
$E_a$ = elevon average displacement
$R_0$ = roll angle between glider body axis and vertical
$P_0$ = pitch angle between glider body axis and vertical
$R_t$ = roll reference or trim angle
$P_t$ = pitch reference or trim angle When the relations of the above equations are maintained the glider will fly on a prescribed glide path $P_t$, and with a roll angle of $R_t$ which would normally be zero.

System response to homing information

The homing information produced by the scanning device carried by the glider is used to control the glider directionally by making the trim angles $R_t$ and $P_t$ a function of the yaw and pitch heading errors respectively.

The rate of correction of the heading error should be proportional to the magnitude of the heading error. The aerodynamics of the glider make the rate of change of yaw proportional to the angle of roll. Therefore the angle of roll is made proportional to the yaw heading error so that the desired relationship, rate of change of yaw proportional to error in yaw, is obtained. This is accomplished by making the roll trim angle $R_t$ proportional to the right-left error.

The pitch motion of the glider follows the motion of the pitch trim angle $P_t$. Therefore in order to obtain a rate of change of pitch correction proportional to the error in pitch the rate of change of the pitch trim angle $P_t$ is made proportional to the pitch error.

Referring again to Figs. 2a and 2b for a detailed description of the control system, elements 5 and 6 of Fig. 2a are the elevons which constitute the only control surfaces of the glider, as already explained. The elevons are mechanically linked by a differential-summing linkage, generally indicated as 10, which has two drives, namely, the shafts 11 and 12. Rotation of shaft 11 causes the elevons to rotate in opposite directions or differentially, while rotation of shaft 12 moves the elevons in the same direction or, in other words, changes their average position. The shafts 11 and 12 are driven by drive motor 13 to which they may be selectively coupled for rotation in either direction by magnetically controlled clutches 14 and 15. Referring to clutch 14, gears 16 and 17 are geared to motor 13 for constant rotation in opposite directions. A multiple disc clutch, arranged to be actuated by lever 18, is provided between each of gears 16 and 17 and shaft 20. The lever 18 is in turn actuated by electromagnets 19 so that when the magnets are de-energized or equally energized the armature 21 is in the center and neither of gears 16 and 17 is locked to shaft 20. Increasing the energization of the lower magnet and decreasing that of the upper causes the armature 21 to be pulled downward and the gear 16 to be locked to shaft 20 for rotation of shaft 11 in one direction. The reverse of the above conditions releases gear 16 and engages gear 17 for rotation of shaft 11 in the opposite direction. The construction and operation of clutch 15 is identical to that of clutch 14.

In Fig. 2b, 22 generally represents the vertical gyroscope which serves as a reference for stabilization of the glider in roll and pitch. The gyroscope comprises a vertical gimbal 23 and a horizontal gimbal 24 both pivoted in the gyroscope casing 25 with axes of rotation 90° apart. The rotor of the gyroscope has its lower bearing slidably supported by the lower portion of gimbal 23. The upper end of the rotor shaft passes through the slotted upper portion of gimbal 23 and also through a slotted ring 26 similar thereto and fixed at right angles to gimbal 24 at its pivot points. With this arrangement the spinning rotor of the gyroscope maintains the gimbals 23 and 24 in vertical and horizontal planes, respectively, regardless of the movement of case 25. Therefore, with the axis of gimbal 23 transverse to the glider and the axis of gimbal 24 parallel to the longitudinal axis of the glider, these gimbals serve as references for the measurement of the pitch and roll angles, respectively, of the glider.

In order to electrically measure the pitch and roll angles rotatable transformers $T_p$ and $T_r$ are provided. Transformer $T_r$ comprises a secondary winding 27 and a primary winding 28 both mounted on suitable cores of magnetic material. The primary windings have a fixed relation to gear 29, however provision may be made for a slight adjustment of this relation if necessary in the final adjustment of the system. The secondary winding 27 is mounted on shaft 30 which is locked to gimbal 24 by crank pin 31 and slotted member 32, as shown. The primary of transformer $T_r$ is excited with 400 cycle A. C. from inverter 33. The transformer is so designed that the magnitude of the voltage induced in the secondary is proportional to the angle of rotation between the primary and secondary. Normally the primary windings 28 are positioned with respect to gear 29 so that the voltage induced in the secondary is zero when the glider wings are level, corresponding to a roll trim angle ($R_t$ in Equation 1) of zero. The secondary voltage is therefore an electrical measurement of the angular departure of the wings from horizontal. The gear 29 is for the purpose of varying the roll trim angle $R_t$ to produce corrections in yaw in accordance with homing information as will be explained later.

The transformer $T_p$ is similar in all respects to transformer $T_r$ and is used to measure pitch angles with respect to a pitch reference or trim angle. For this purpose the secondary winding of this transformer, as in the case of transformer $T_r$, is locked to gimbal 23 by means of crank pin 34 and slotted member 35. The primary windings of transformer $T_p$ are fixed to gear 36, which corresponds to gear 29 for transformer $T_r$, but provision is made for adjusting this fixed relationship, as in the case of transformer $T_r$, in order to set the pitch trim angle to its proper value in the absence of homing signals. This value of the pitch trim angle will not be zero as in the case of the roll pitch angle but will have a value determined by the desired glide path. In the presence of homing signals the pitch trim angle is varied through the rotation of gear 36 to produce corrections in pitch, as will be explained later.

The secondary windings of transformer $T_p$ and $T_r$ are coupled to input circuits of pitch control amplifier 37 and roll control amplifier 38, respectively, both of which are identical in construction and operation. Considering the pitch control amplifier 37, the secondary voltage of transformer $T_p$ is applied in series with the voltage across a portion of inductance 40, to the primary winding of transformer 39. The voltage across inductance 40 is obtained from the secondary of transformer $T_a$, Fig. 2a, which is a rotatable transformer similar to $T_p$ and $T_r$ and serves to electrically measure the average displacement of elevons 5 and 6 from their zero or streamline position. The transformer $T_a$ is excited from inverter 33 through terminals i—j and is adjusted to produce zero voltage in its secondary when the elevons are in their streamline position, and to produce a voltage in phase with the primary voltage for average displacement on one side of the streamline position and 180° out of phase with the primary voltage for average displacement on the other side of the streamline position, with the magnitude of the voltage in each case proportional to the amount of the displacement. Likewise the secondary voltage of transformer $T_p$ may have either of two phases 180° apart depending upon the direction of angular displacement of the secondary from its zero voltage position.

The voltage applied to the primary of transformer 39 is therefore the vector sum of two voltages each of which may assume either of two possible phases. The resultant voltage is amplified by alternating current amplifier 41 and applied in opposite phase, by means of center tapped secondary winding 42, to the cathodes of rectifiers 43 and 44 forming part of a sense detecting circuit 45. Transformer 46 has its primary excited from inverter 33 and its secondary connected so as to apply voltages in the same phase to rectifiers 43 and 44. Resistors 47 and 48 act as load devices for rectifiers 43 and 44, respectively. Since transformers $T_p$, $T_a$ and 46 are all excited from the same source, and since the phase shift produced by a transformer is either zero or 180°, it is evident that, in the presence of output from amplifier 41, the two voltages applied to one of the rectifiers of circuit 45 will be in the same phase and the voltages applied to the other rectifier will be in phase opposition. This results in the larger voltage being developed across the load resistor associated with the rectifier for which the applied voltages are in phase, which determines the polarity or the total voltage developed across the series connected load resistors 47 and 48. This total voltage is applied across grid resistors 49 and 50, which also form a part of phase correcting circuit 51, and thence to the grids of tubes 53 and 54 of direct current amplifier 52. If, for example, the two voltages applied to rectifier 44 have the same phase then the grid of tube 53 becomes more positive and that of tube 54 becomes more negative resulting in an increase in current in the upper electromagnet and a decrease in current in the lower electromagnet of magnet assembly 55 (Fig. 2a). This causes armature 56 to move upward and the lower of the two clutches 15 to be engaged, thus rotating shaft 12 and changing the average position of the elevons in one direction. Similarly a reversal in the phase of the voltage across the primary of transformer 39 brings the voltages applied to rectifier 43 in phase resulting in greater conduction in tube 54 and engagement of the upper of the two clutches 15 to cause rotation of shaft 12 and displacement of the elevons in the opposite direction.

From the above it is seen that the direction of displacement of the elevons is determined by the phase of the voltage applied to the primary winding of transformer 39. It will also be seen that the magnitude of the displacement is proportional to the magnitude of the change in the secondary voltage of transformer $T_p$. Assume, for example, that the secondary of transformer $T_p$ is in its zero voltage position and, likewise, that elevons 5 and 6 are in the streamline or zero position so that no voltage appears in the secondary of transformer $T_a$. Rotation of transformer $T_p$ through a given angle produces a voltage across the primary of transformer 39 the phase of which is determined by the direction of rotation. There is no other voltage applied to this primary since the voltage from transformer $T_a$ is zero at this time. The application of a voltage to the primary of transformer 39 causes a displacement of the average position of the elevons through the action of pitch control amplifier 37 in the manner already explained. However, as the elevons are displaced a voltage proportional to the displacement is induced in the secondary of transformer $T_a$ and applied, in series with the voltage from transformer $T_p$, to the primary of transformer 39. This voltage is 180° out of phase with the voltage from transformer $T_p$ so that the resultant voltage applied to the primary of transformer 39 is reduced. When the resultant voltage has been reduced to zero no further voltage is applied by amplifier 31 to sense detecting circuit 45 and, as a result, tubes 53 and 54 become equally conductive thus releasing clutch 15 and preventing any further displacement of the elevons. If transformer $T_p$ is rotated through an additional angle in the same direction the voltage from this transformer will again exceed that from $T_a$ and the resultant voltage applied to the primary of transformer 39 will cause further displacement of the average position of the elevons in the same direction as before. This displacement will continue until the input to amplifier 41 is again zeroed by the voltage from $T_a$. If transformer $T_p$ is now rotated through an angle in the opposite direction the voltage therefrom applied to the primary of transformer 39 will be reduced so that the voltage applied to this primary by transformer $T_a$ now predominates. Since the phase of the latter voltage is reverse to that of the former the circuit 37 operates to displace the elevons in the opposite direction until the voltage from transformer $T_a$ applied to the primary of transformer 39 is reduced to equal that supplied by $T_p$ thus reducing the input to amplifier 41 to zero and stopping further elevon displacement.

The above described system for controlling the average displacement of the elevons in proportion to the rotation of transformer $T_p$ is duplicated for controlling the differential displacement thereof in proportion to the rotation of transformer $T_r$. The roll control amplifier 38 is identical to pitch control amplifier 37 and cooperates with transformers $T_r$ and $T_d$ (Fig. 2a) in the same manner that amplifier 37 cooperates with transformers $T_p$ and $T_a$.

In order to effect corrections in the heading of the glider in accordance with error signals received from the scanning system, provision is made for varying the roll and pitch trim angles in proportion to the magnitude of the heading error and in the proper direction to correct the error.

As already mentioned yaw errors in heading are corrected by rolling the glider through an angle proportional to the magnitude of the error. The rate of change of yaw, being proportional to the roll angle, is therefore made proportional to the magnitude of the heading error. The error signal for right-left or yaw correction supplied by the scanning device is, as already pointed out, a direct voltage the magnitude of which is proportional to the magnitude of the error and the polarity of which is indicative of the direction of the error. This signal is applied between the R–L terminals of roll trim amplifier 60. The roll trim amplifier comprises two push-pull direct coupled stages with relays 65 and 66 located in the plate circuits of final tubes 63 and 64 respectively. These relays serve to operate reversible D. C. motor 67 in either direction depending upon which of the two relays is actuated. In the absence of a signal at terminals R–L the plate currents of tubes 63 and 64 are below the threshold values of relays 65 and 66 so that both relays are unoperated and the armature of the motor is short circuited. Motor 67 serves to rotate gear 29 and the primary windings of transformer $T_r$ attached thereto through suitable reduction gearing. A potentiometer 68 is driven by gear 69 so that its rotation is proportional to the rotation of transformer $T_r$ through gear 29. This potentiometer is so adjusted that the voltage between slider 70 and point 71 is zero when gear 29 is in the position for which the roll trim angle has its original or reference value, which in this case would normally be zero. The taper of the potentiometer resistance should be linear so that the voltage between conductors 73 and 74 is proportional to the rotation of gear 29 from its above described neutral position. Due to the fact that point 71 is intermediate the ends of the voltage source supplying the potentiometer the polarity of the output between conductors 73 and 74 is determined by the direction of rotation of gear 29 from its neutral position. The conductor 73 is connected to the cathode of tube 61 and conductor 74 to the cathode of tube 62.

The operation of the roll trim control circuit may be understood by assuming the gear 29 to be in its neutral position, so that the voltage between conductors 73 and 74 is zero, and that a yaw heading error voltage is applied to terminals R–L of such polarity that R is positive with respect to L indicating that a right correction is required. This signal raises the grid potential of tube 62 and lowers the grid potential of tube 61 so that relay 66 is operated causing motor 67 to rotate gear 29. However, through the action of potentiometer 68, as gear 29 rotates conductor 74 becomes increasingly positive with respect to conductor 73 thus raising the potential of the cathode of tube 62 and lowering the potential of the cathode of tube 61 by equal amounts. Motor 67 continues to run and gear 29 to rotate until the potential of the grid of tube 62 has risen by an amount equal to the rise in potential of the grid due to the error signal, and the potential of the cathode of tube 61 has been lowered by an amount equal to the reduction of the potential of the grid of this tube by the signal. At or slightly beyond this point relay 66 releases and relay 65 operates reversing the motor. However, reversal of the motor lowers the cathode potential of tube 62 and raises that of tube 61, through the action of potentiometer 68, so that relay 66 is actuated and relay 65 released to again reverse the motor. This process continues so that contact 70 of potentiometer 68 oscillates slightly about a point having an angular displacement from its zero or neutral point proportional to the error signal. It will be evident that through the above described process the gear 29 was rotated through an angle proportional to the amplitude of the voltage between terminals R–L.

Since the potentials of the cathodes of tubes 61 and 62 were raised and lowered respectively by the same amount that the corresponding grids were raised and lowered by the error signal it is evident that the potential between the grid and cathode of each of these tubes is the same in the new condition of equilibrium as it was when gear 29 and potentiometer 68 were in their neutral positions. Hence, if the signal between terminals R–L is now reduced, the resulting rise in potential of the grid of tube 61 with respect to the cathode will cause relay 65 to operate and motor 67 to rotate gear 29 and potentiometer 68 in the opposite direction. This will continue until the cathode potential of tube 61 is raised through the action of potentiometer 68 by an amount equal to the rise in potential of the grid of this tube caused by the reduction in signal, and the cathode of tube 62 is lowered in potential by an amount equal to the reduction in grid potential of this tube due to the reduction in the signal. At, or slightly beyond this point, relay 65 releases and relay 66 operates reversing the motor and setting up the above described oscillation of the slider of potentiometer 68 about a new point which is angularly related to the neutral point of the potentiometer in proportion to the new value of the signal. Any change in the signal between R–L is therefore accompanied by a proportional rotation of gear 29. If the error signal is reversed in polarity calling for a correction to the left, the action is exactly analogous to that described above for a right correction except that gear 29 and potentiometer 68 are rotated to the opposite side of their neutral positions.

Correction of pitch heading errors of the glider are brought about by varying the pitch trim angle in accordance with an up-down error signal obtained from the scanning device. As stated before, in this case, it is necessary to obtain a rate of change of pitch correction proportional to the error in pitch. This is accomplished by making the rate of change of the pitch trim angle proportional to the pitch error. The pitch trim amplifier 75 is a push-pull direct current amplifier similar to the roll trim amplifier 60. Relays 80 and 81 are connected in the plate circuits of final tubes 78 and 79 respectively and operate to control a direct current reversible motor 82. Operation of one relay but not the other causes rotation of the motor in a direction determined by which of the two relays was operated, while deenergization of both relays short circuits the armature of the motor and renders it inoperative. The amplifier 75 is so adjusted that in the absence of a signal at terminals U–D the space currents of both tubes are below the threshhold value of the relays and both relays are in their released positions. The motor is mechanically coupled to gear 36, to which the primary windings of transformer $T_p$ are fixed, through a suitable gearing system including a gear 83 which drives direct current generator 84. This generator produces a voltage between conductors 85 and 86 the polarity of which is determined by the direction of rotation and the amplitude of which is proportional to the speed of rotation. The conductor 86 is connected to the cathode of tube 76 and the conductor 85 to the cathode of tube 77 so that the generated voltage controls the potential of these cathodes.

The operation of the pitch trim control system will be understood by assuming, for example, that a pitch error signal is applied between terminals U–D with terminal U positive with respect to terminal D, indicating that an upward correction is required. This signal raises the potential of the grid of tube 78 and lowers the potential of the grid of tube 79 causing relay 80 to operate and motor 82 to start rotating gear 36 to change the pitch trim angle. However, as the motor begins to rotate, generator 84 begins to develop a voltage proportional to its speed between conductors 86 and 85 with conductor 86 positive with respect to conductor 85, thus raising the potential of the cathode of tube 76 and lowering the potential of the cathode of tube 77. The motor continues to accelerate until the cathode of tube 76 has been raised in potential by an amount equal to the rise in potential of the grid of this tube due to the error signal and the cathode of tube 77 has been lowered in potential by an amount equal to the reduction in potential of the grid of this tube by the signal. At or slightly beyond this point relay 80 releases and relay 81 is operated thus rapidly decelerating motor 82. However deceleration of the motor is accompanied by a reduction in potential of the cathode of tube 76 and a rise in potential of the cathode of tube 77, due to the action of generator 84, causing relay 80 to again operate and relay 81 to release. This causes the motor to accelerate until reversal of the relays again occurs. By this process the relays reverse at a frequency of about 20 per second and the speed of the motor oscillates about an average value proportional to the magnitude of the error signal, as required.

If the polarity of the error signal is reversed, indicating that a downward correction is required, the operation as described above is reversed and the motor 82 rotates in the opposite direction.

The overall operation of the control system may be best understood by considering separately (1) the operation of the system in the absence of homing signals and in the presence of flight disturbances and (2) the operation of the system with homing information present but no flight disturbances.

In the absence of homing signals the gears 29 and 36 are in their neutral positions for which the roll and pitch trim angles have the proper values for flight along a prescribed glide path with wings level. As already explained these pitch angles may be adjusted by changing the angular relation between the primary winding of transformer $T_r$ and $T_p$ and the gears 29 and 36, respectively. For level wings the roll trim angle would normally be zero. The pitch trim angle however has a value determined by the glide path desired. This would normally require a rotation of the primary windings of $T_p$ with respect to gear 36 through an angle equal and opposite to the angle through which the nose of the glider must be lowered for flight along the prescribed glide path. With the above defined trim angles set into the system and with the glider travelling along the prescribed glide path with wings level the voltages induced in the secondaries of both transformers $T_r$ and $T_p$ will be zero and the elevons will be in their neutral or streamline position. Assume now that a roll disturbance occurs which rotates the glider in the positive sense as defined in Fig. 1. This will cause rotation of the gyroscope case and the primaries of transformer $T_r$ in a counterclockwise direction, as seen in Fig. 2b; however, the gimbal 24 will be held in its horizontal position by the vertical gyroscope acting through slotted ring 26 and rotation of the secondary winding of $T_r$, which is attached to this gimbal, will be presented. The resulting relative rotation between the primary and secondary windings of $T_r$ results in a voltage in the secondary winding proportional to the roll displacement of the glider. This voltage acts through roll control amplifier 38, in a manner already explained, to rapidly produce a proportionate differential displacement of the elevons in the proper direction to roll the glider in a direction opposite to the original disturbance. As the glider wings return to the level position the voltage induced in the secondary of $T_r$ reduces concurrently to zero and the predominating voltage from transformer $T_d$ acting through amplifier 38 reduces the elevon displacement eventually to zero, or to their original streamline position, when level flight has again been attained. A negative roll disturbance is countered by a positive roll correction in exactly the same way.

For operation of the pitch control system assume that a positive pitch disturbance occurs, as defined in Fig. 1, which causes the nose of the glider to be too high for flight along the prescribed glide path. This results in a counterclockwise rotation, as seen from the left in Fig. 2b, of the primary windings of $T_p$, resulting in a voltage proportional to the pitch disturbance being developed in the secondary of the transformer which is restrained from rotating by gimbal 23. This voltage acts through pitch control amplifier 37 in a manner already explained to produce an average displacement of the elevons proportional to the disturbance and in the proper direction to lower the nose. As the glider returns to the proper attitude the elevon displacement is removed in response to voltage from transformer $T_a$. A pitch disturbance in the negative sense is corrected in a similar manner.

To explain the operation of the system in response to homing signals in the absence of flight disturbances, assume that a correction to the right is required as evidence by an error voltage between the R–L terminals with terminal R positive. In a manner already explained this voltage operates through roll trim amplifier 60 to rotate gear 29 and primary windings 28 through a clockwise angle proportional to the magnitude of the error signal. This operates exactly like a disturbance in roll to roll the glider in the positive sense through an angle proportional to the error signal resulting in a rate of turn in yaw to the right proportional to the error signal. As the yaw error is corrected the error signal diminishes, with the primaries of $T_r$ rotating as a result to their original positions and the glider wings returning to level. A yaw error requiring a correction to the left is corrected in a similar manner.

To correct heading errors in pitch the pitch trim angle is varied, through rotation of gear 36, in the proper direction to correct the error. If a pitch heading error exists a voltage appears between the U–D terminals of the pitch trim amplifier 75, relay 80 or 81 operates and the pitch trim motor 82 rotates to drive gear 36 at a speed proportional to the heading error as already explained. When the primary windings of transformer $T_p$ have been displaced for their zero position with respect to the secondary winding a signal is applied to pitch control amplifier which acts to change the average elevon position. The glider responds to this change in control surface position and as it changes its pitch position the secondary of the pitch transformer $T_p$ is realigned with the primaries for zero coupling therebetween, thus the rate of motion of the glider in pitch is proportional to the rate of rotation of the primary windings of transformer $T_p$, which in turn is proportional to the magnitude of the up-down heading error.

After considering the two types of correction in the system separately it becomes obvious that the system will operate to correct for flight disturbances in the presence of heading corrections in exactly the same manner as it does in the absence thereof.

I claim as my invention:

1. A control system for a homing missile of the glider type in which aerodynamic control of the glider is effected by elevons and in which means are provided for producing homing information in the form of right-left and up-down error signals, said system comprising means for establishing a roll reference angle and a pitch reference angle, means for measuring the angular difference between the roll angle of said glider and said roll reference angle, means for measuring the angular difference between the pitch angle of said glider and said pitch reference angle, means for producing a differential displacement of the elevons proportional to the difference between said roll angle and said roll reference angle and in the proper direction to reduce said difference, means for producing an average displacement of the elevons proportional to the difference between said pitch angle and said pitch reference angle and in the proper direction to reduce said difference to zero, means actuated by said right-left error signal for changing said roll reference angle from its original value by an amount proportional to the right-left error signal and in a direction determined by the right or left characteristic of the signal for producing a right-left correction in the flight of the glider, and means for changing said pitch reference angle at a rate proportional to the up-down error signal and in a direction determined by the up or down characteristic of the signal for producing an up-down correction in the flight of the glider, said last named means comprising means for producing a rate signal proportional to the rate of change of said pitch reference angle and means responsive to a difference between said up-down error signal and said rate signal for effecting a change in said pitch reference angle.

2. Apparatus as claimed in claim 1 in which said means for establishing a roll reference angle and said means for measuring the angular difference between said roll angle and said roll reference angle comprise a vertical gyroscope, a roll rotatable transformer having its axis of rotation parallel to the roll axis of said glider, means for adjusting the angular relationship between the center line of the roll transformer primary winding and the plane defined by the pitch and roll axes of said glider to establish a roll reference angle, means including a fixed coupling between the secondary winding of said roll transformer and the rotating element of said vertical gyroscope for maintaining the center line of said secondary winding always in a vertical plane through said roll transformer axis, and means for energizing the primary winding of the roll transformer from a common source of alternating current, and in which said means for establishing a pitch reference angle and said means for measuring the angular difference between said pitch angle and said pitch reference angle comprise a pitch rotatable transformer having its axis of rotation parallel to the pitch axis of said glider, means for adjusting the angular relationship between the center line of the pitch transformer primary winding and the plane defined by the pitch and roll axes of the glider to establish a pitch reference angle, means including a fixed coupling between the secondary winding of said pitch transformer and the rotating element of said vertical gyroscope for maintaining the center line of said secondary winding always in a vertical plane through said pitch transformer axis, and means for energizing the primary winding of the pitch transformer from said common source.

3. Apparatus as claimed in claim 2 in which said roll and pitch rotatable transformers have zero coupling between primary and secondary windings when said center lines of these windings are 90° apart and in which angular departure from this zero coupling position produces a voltage in the secondary winding proportional to the angular departure and either in the same phase or in phase opposition to the primary voltage depending upon the direction of the departure.

4. Apparatus as claimed in claim 3 in which said means for producing a differential displacement of the elevons proportional to the difference between said roll angle and said roll reference angle and in the proper direction to reduce said difference comprises means energized from said common source for producing a voltage proportional to the differential displacement of said elevons and having one of two opposite phases depending upon the direction of the displacement, selective means for differentially displacing said elevons in either direction, a roll sense detecting circuit, means for vectorially adding said voltage proportional to the differential displacement of the elevons to the secondary voltage of said roll transformer and for applying the resultant voltage to said roll sense detecting circuit, means for applying a reference voltage from said common source to said roll sense detecting circuit for comparison in phase with said resultant voltage, and means connecting said sense detecting circuit to said selective means whereby said elevons are differentially displaced in the presence of a resultant signal greater than zero in a direction determined by the phase relationship between said reference voltage and said resultant voltage.

5. Apparatus as claimed in claim 4 in which said means for producing an average displacement of the elevons proportional to the difference between said pitch angle and said pitch reference angle and in the proper direction to reduce said difference comprises means energized from said common source for producing a voltage proportional to the average displacement of said elevons from the streamline position and having one of two opposite phases depending upon the direction of the displacement, selective means for producing average displacement of said elevons in either direction, a pitch sense detecting circuit, means for vectorially adding said voltage proportional to the average displacement of the elevons to the secondary voltage of said pitch transformer and for applying the resultant voltage to said pitch sense detecting circuit, means for applying a reference voltage from said common source to said pitch sense detecting circuit for comparison in phase with said resultant voltage, and means connecting said sense detecting circuit to said selective means whereby the average position of said elevons is displaced in the presence of a resultant signal greater than zero in a direction determined by the phase relationship between said reference voltage and said resultant voltage.

6. Apparatus as claimed in claim 5 in which said up-down and right-left error signals are direct voltages proportional in amplitude to the magnitude of the error and with polarity indicative of the direction of the error and in which said means for changing said roll reference angle from its original value by an amount proportional to the right-left error signal and in a direction determined by the right or left characteristic of the signal comprises a reversible motor coupled to the primary winding of said roll transformer for rotating said primary winding in either direction about the axis of said transformer, means coupled to said primary winding to generate a direct feedback voltage having a value proportional to the angular displacement of said primary winding from its original position and a polarity determined by the direction of the displacement, a forward direct current amplifier and a reverse direct current amplifier, means utilizing the output currents of said amplifiers to control the forward and reverse rotation of said motor, means for applying said feedback voltage in equal amounts and opposite polarity to the input circuits of said amplifiers, and means for applying said right-left error signal in equal amounts and opposite polarity to said input circuits in series with said feedback voltage.

7. Apparatus as claimed in claim 6 in which said means for producing a rate signal proportional to the rate of change of said pitch reference angle is a direct current generator rotatable in either direction and having an independently established field for generating said rate signal in the form of a direct rate voltage having a magnitude proportional to the speed of the generator and a polarity determined by its direction of rotation, and in which said means responsive to a difference between said up-down error signal and said rate signal for effecting a change in said pitch reference angle comprises a reversible motor coupled to the primary winding of said pitch transformer for rotating said primary winding in either direction about the axis of said transformer, a forward direct current amplifier and a reverse direct current amplifier, means utilizing the output currents of said amplifiers to control the forward and reverse rotation of said motor, means for applying said rate voltage in equal amounts and opposite polarity to the input circuits of said amplifiers, and means for applying said up-down error signal in equal amounts and opposite polarity to said input circuits in series with said rate voltage, and a mechanical coupling between said generator and said motor for driving said generator at a speed proportional to that of said motor.

References Cited in the file of this patent

UNITED STATES PATENTS

| | | |
|---|---|---|
| 2,417,821 | Harcum et al. | Mar. 25, 1947 |
| 2,424,193 | Rost et al. | July 15, 1947 |
| 2,448,007 | Ayres | Aug. 31, 1948 |
| 2,462,081 | Esval | Feb. 22, 1949 |